(12) United States Patent
Hiraki et al.

(10) Patent No.: US 6,392,674 B1
(45) Date of Patent: May 21, 2002

(54) POINTER MARK DISPLAY CONTROLLER, DISPLAY CONTROL METHOD, DISPLAY CONTROL SYSTEM, AND ITS STORAGE MEDIUM

(75) Inventors: Yukio Hiraki, Atsugi; Kohei Inamura; Izumi Kanai, both of Sagamihara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,127

(22) Filed: Jul. 28, 1999

(30) Foreign Application Priority Data

Jul. 28, 1998 (JP) .......................................... 10-226593
Jul. 15, 1999 (JP) .......................................... 11-201431

(51) Int. Cl.[7] ................................................ G09G 5/00
(52) U.S. Cl. .................... 345/857; 345/858; 345/859; 345/860; 345/861; 434/429

(58) Field of Search .................................. 434/429, 430; 345/856, 857, 858, 859, 860, 861, 862

(56) References Cited

U.S. PATENT DOCUMENTS 5,596,347 A * 1/1997 Robertson et al. .......... 345/856
5,613,019 A * 3/1997 Altman et al. .............. 382/311

* cited by examiner

Primary Examiner—Ba Huynh
(74) Attorney, Agent, or Firm—Fitzpatrick, Cella, Harper & Scinto

(57) ABSTRACT

A method and an apparatus for displaying a pointer mark preferable for an application to a presentation system and the like. With a reference point on a display screen being preset, when an arbitrary point is pointed on the display screen, a pointer mark is generated in a direction from the preset reference point to a pointing point related to the pointing and an image (including the pointer mark) displayed on this display screen is transferred to a projector so as to be projected on a large-sized screen.

56 Claims, 10 Drawing Sheets

FIG. 2
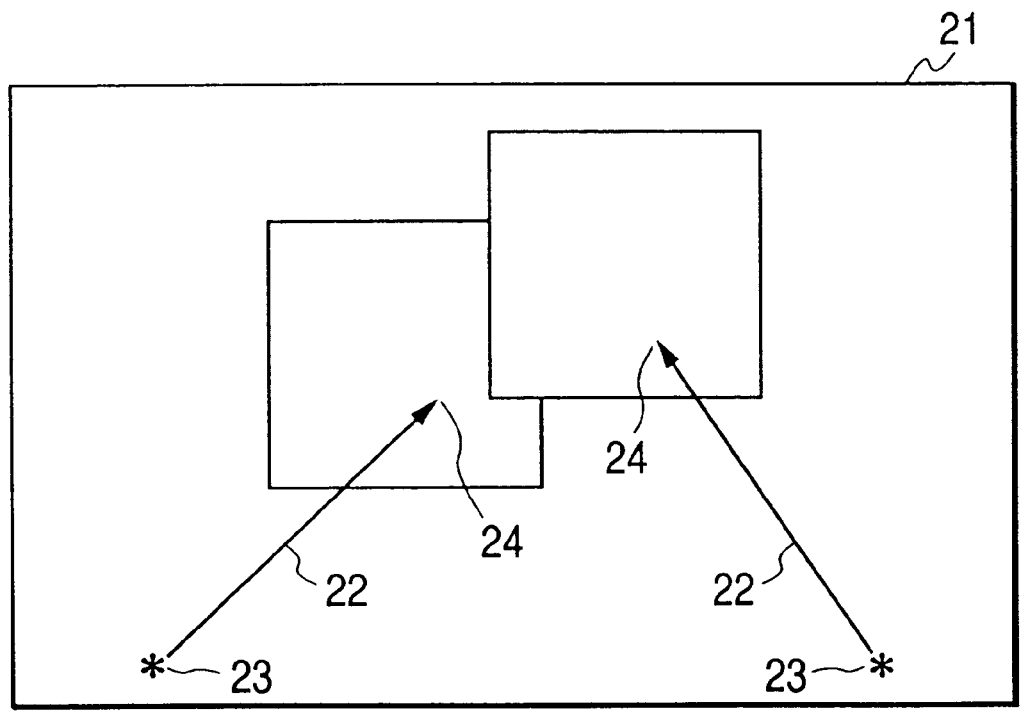
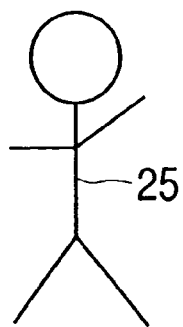
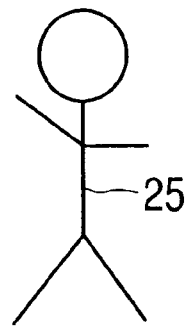

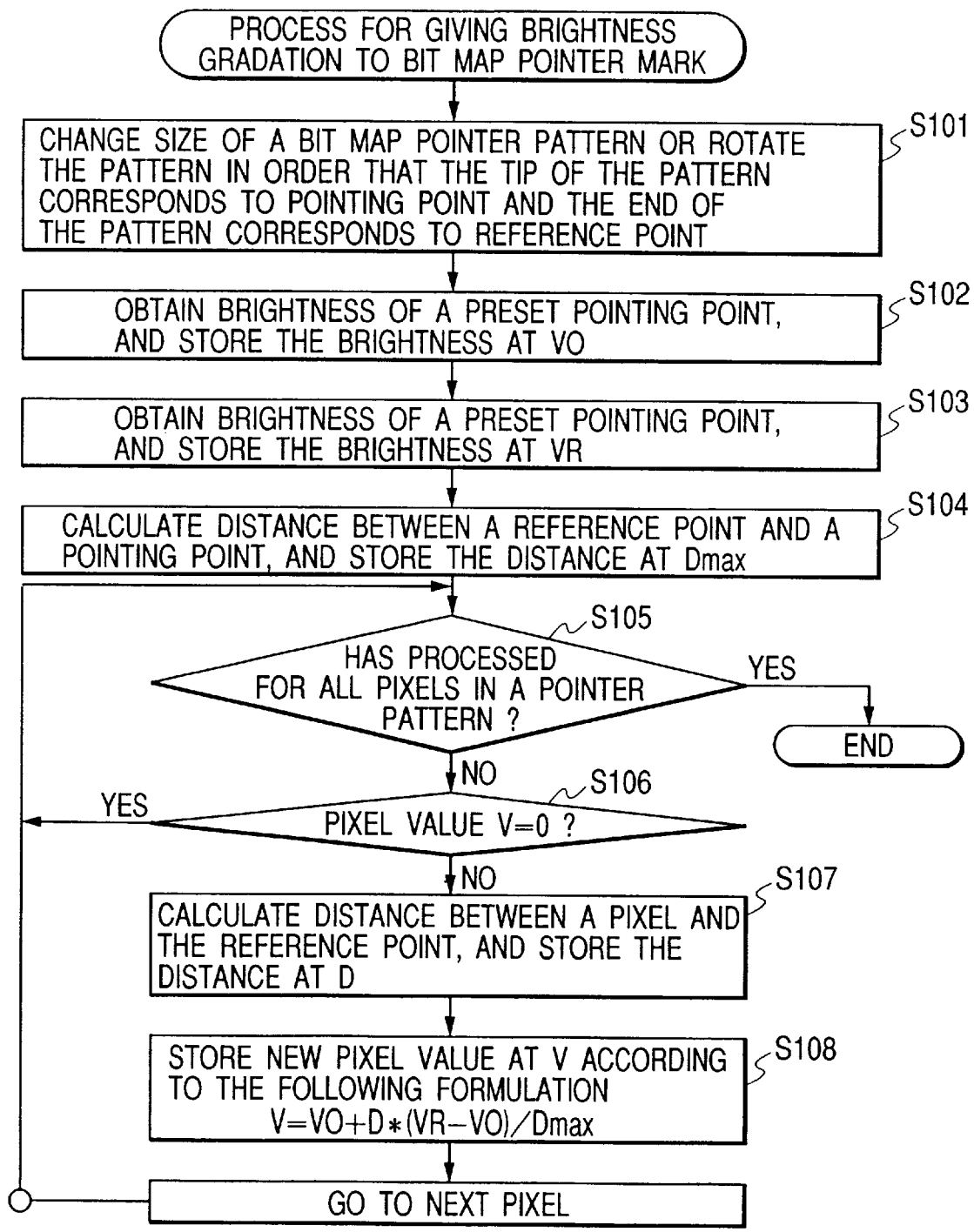

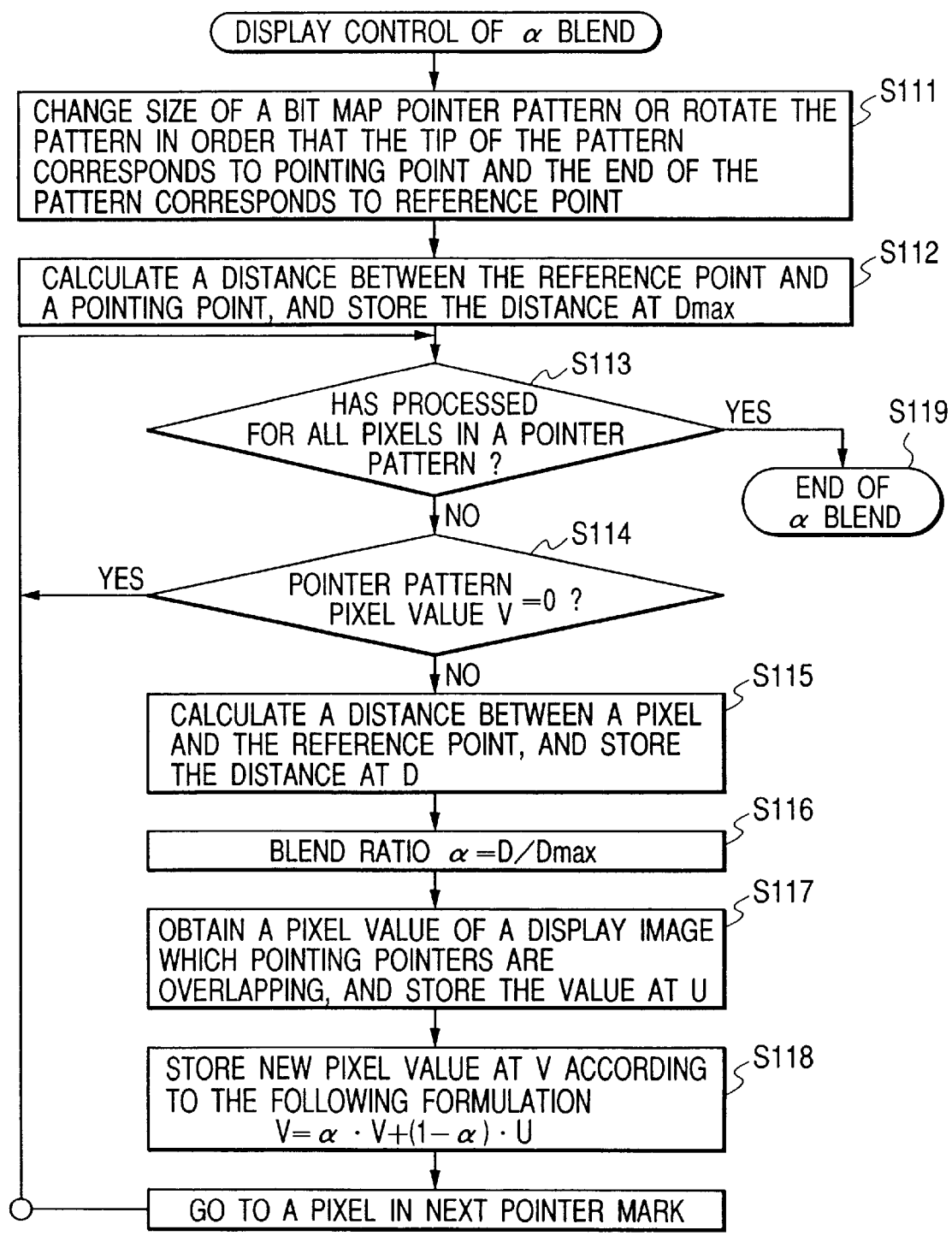

POINTER MARK DISPLAY CONTROLLER, DISPLAY CONTROL METHOD, DISPLAY CONTROL SYSTEM, AND ITS STORAGE MEDIUM

BACKGROUND OF THE INVENTION

1. Field of the Invention

The present invention relates to display control techniques for a cursor or other pointer marks.

2. Related Background Art

In recent years, an information processing unit such as a personal computer is provided with a bit map display as a display unit, and use of a graphical user interface has been generalized which permits inputs with graphical information such as icons or the like by using a mouse or an electronic pen as a pointing device for designating a coordinate position on the bit map display.

When pointing a coordinate position such as an icon, a character input position or the like on a display screen in this type of a graphical user interface, a pointer mark is displayed in the pointing position. As pointer mark patterns, generally an arrow cursor pointing to the upper left, a vertical-bar type I beam (caret), and the like are used.

In the following embodiments, a term "pattern" includes a meaning of a direction of a pattern as well as the pattern itself.

In addition, there is a known apparatus which displays pointer marks having different patterns according to areas of its display screen so as to achieve a more favorable graphical user interface. Furthermore, there is disclosed an apparatus in which a pointer mark pattern (including its direction) is changed according to a designated position on a display screen so that the pointer mark can be displayed also when designating a corner of the display screen in Japanese Patent Application Laid-open No. 6-289835.

Furthermore in recent years, these types of information processing units are used for presentation. In using this type of a presentation system, for example, in a lecture class or in a technical explanation meeting, an image signal displayed on a display screen of a personal computer is inputted into a projector such as a liquid crystal projector and then the above image is projected on a large-sized screen by this projector so as to present data or the like at a time to a large attendance. An explainer in the technical explanation meeting proceeds with an explanation while moving a pointer mark to an explained point (watch point) by using a pointing device of the personal computer.

Also in this type of a presentation system, conventionally a pattern used for an information processing unit has been appropriated without any change as a pointer mark pattern.

When the presentation system is used in a technical explanation or other meeting, lines of sight of the attendants tend to be not focused only on the projected screen, but to be frequently reciprocating between the pointer mark position on the projected screen and the explainer due to the characteristics of the technical explanation meeting. Therefore, in the presentation system, it is preferable to use a pointer mark pattern which connects the explainer with the pointing position on the projected screen in a natural form.

The conventional pointer mark pattern, however, has been determined on the assumption that a user views only the display screen of the information processing unit, but it is not assumed to be used for the presentation system, and therefore it is hard to connect the explainer with the pointing position on the projected screen in a natural form as described above.

In view of the foregoing background, the present invention has been provided. Accordingly, it is an object of the present invention to provide a display of a pointer mark preferable to be applied to a presentation system.

SUMMARY OF THE INVENTION

According to one aspect of the present invention, there is provided a pointer mark display controller comprising a designation means for designating an arbitrary point on a display screen, a setting means for presetting a reference point on the display screen, a generation means for generating a pointer mark having a direction from a reference point set by the setting means to a pointing point related to the designation when an arbitrary point on the display screen is designated by the designation means, and a display control means for displaying the pointer mark generated by the generation means on the display screen.

BRIEF DESCRIPTION OF THE DRAWINGS

FIG. 2 is a diagram illustrating a positional relationship between an explainer and a pointer mark;

FIG. 10 is a flowchart of a pointer mark generation process in still another embodiment;

FIG. 11 is a flowchart of a pointer mark generation process in further still another embodiment;

DESCRIPTION OF THE PREFERRED EMBODIMENTS

Figure 1:
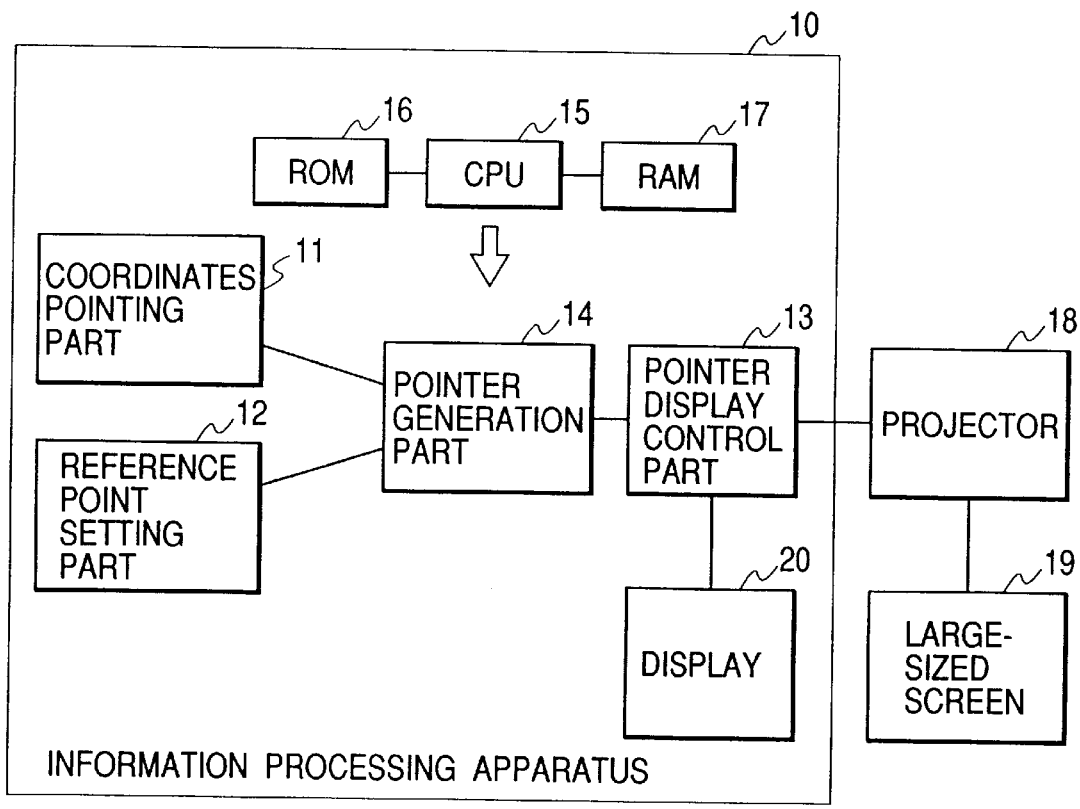
FIG. 1 is a functional block diagram of a pointer mark display controller according to an embodiment of the present invention.

Referring to FIG. 1, there is shown a functional block diagram of a pointer mark display controller according to an embodiment of the present invention. This pointer mark display controller is mounted on an information processing unit 10 such as a personal computer, on the assumption that it is applied to a presentation system.

In FIG. 1, there are shown a coordinates pointing part 11 for designating a point on a display screen 21 (See FIG. 2) of a display 20 and a reference point setting part 12 for setting a reference point on the display screen 21. As a device for operating the coordinates pointing part 11 and the reference point setting part 12, a mouse or an electronic pen is used, and the coordinates pointing part 11 and the reference point setting part 12 recognize a coordinate position pointed by the mouse or electronic pen. Then, the coordinates pointing part 11 processes the recognized coordinate position as coordinate position data of a tip position of a pointer mark 22 (See FIG. 2) and the reference point setting part 12 registers the recognized coordinate position as coordinate position data of a starting point position of the pointer mark 22.

A pointer display control part 13 controls a display of the pointer mark 22. A pointer generation part 14 generates the pointer mark 22 on the basis of the coordinate position data of the tip position of the pointer mark 22 processed by the coordinates pointing part 11 and the coordinate position data of the starting point position of the pointer mark 22 registered by the reference point setting part 12. The pointer display control part 13 displays the pointer mark 22 generated by the pointer generation part 14 on a display screen 21 (See FIG. 2) of a display 20 and sends an image signal of an image (including the pointer mark 22) displayed on the display screen 21 to a projector 18 such as a liquid crystal projector. Then, the image related to the image signal which has been inputted is projected on a large-sized screen 19 by the projector 18.

The coordinates pointing part 11, the reference point setting part 12, the pointer display control part 13, and the pointer generation part 14 are configured so as to perform the above functions under the control of a CPU 15. In this processing, the CPU 15 uses a RAM 17 as a work area or the like while controlling the above functions following control programs corresponding to FIGS. 3 to 5 stored in a ROM 16.

Referring to FIG. 2, there is shown a diagram illustrating clearly a positional relationship between an explainer and the pointer mark 22 displayed under the control of the pointer display control part 13.

In FIG. 2, information from the information processing unit 10 used by the explainer is displayed on the display screen 21. A pointer mark 22 is a mark which is characteristic of the present invention, a reference point 23 is a point set by the reference point setting part 12, and a pointing point 24 is a point pointed by the coordinates pointing part 11.

A plurality of reference points can be set by the reference point setting part 12. A user selects reference points 23 so that, for example, if an explainer 25 stands on the left side (on the left of the display screen 21, strictly speaking, the left of the large-sized screen 19) in FIG. 2 for explanation, a pointer mark 22 is formed by using a reference point 23 on the left of the display screen 21, while if the explainer 25 stands on the right of the display screen 21 (strictly speaking, on the right of the large-sized screen 19) for explanation, a pointer mark 22 is formed by using a reference point 23 on the right of the display screen 21.

Figure 3:
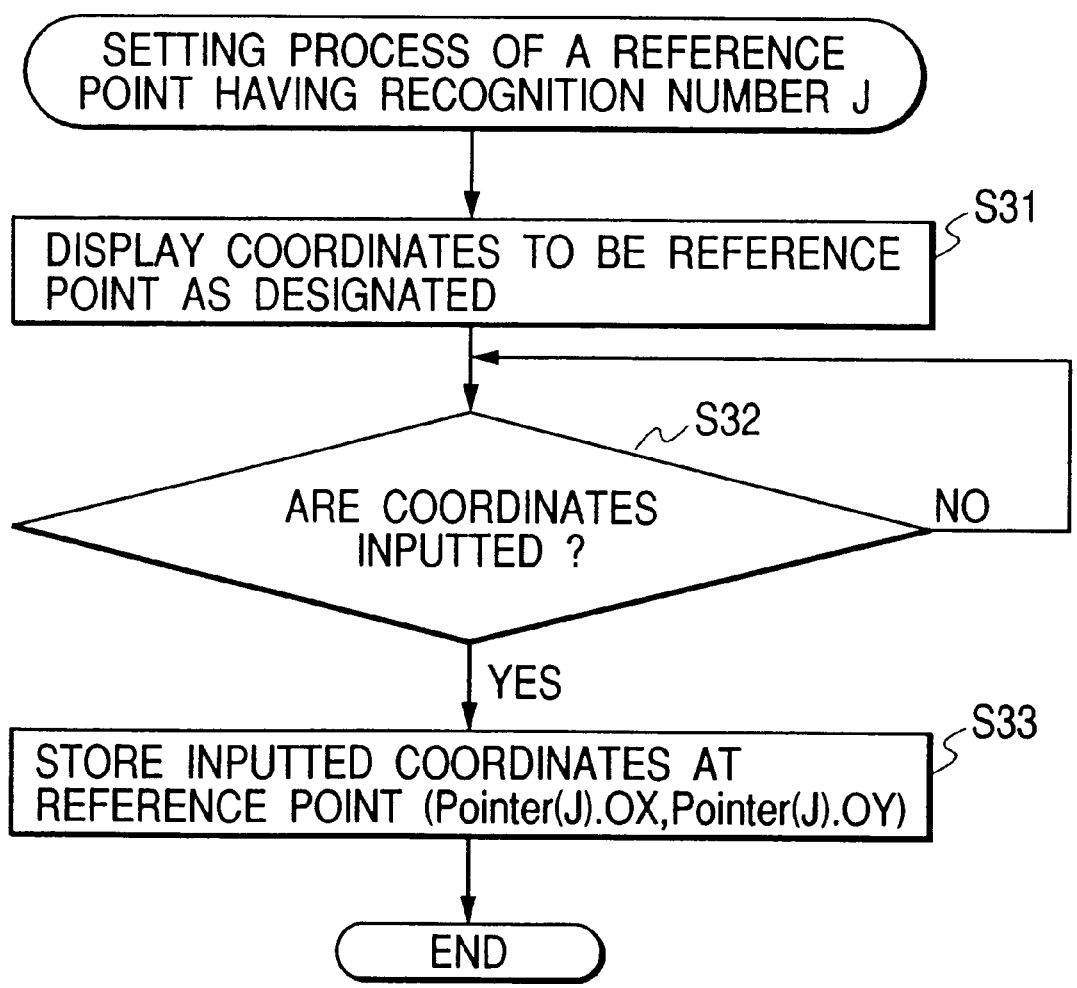
FIG. 3 is a flowchart of a setting process (sub-routine) of a reference point.

Referring to FIG. 3, there is shown a flowchart of a setting process of a reference point. This flowchart corresponds to a sub-routine showing detailed processing of Step S44 in a flowchart in FIG. 4.

The reference point setting part 12 displays a message to prompt a user to point coordinates of a point the user wants to set as a reference point (Step S31). Then, after awaiting for an input of coordinate data with a mouse or other operation (Step S32), the coordinate data is inputted, input coordinate data is stored at a reference coordinate work having a recognition number J [Pointer(J).OX, pointer(J).OY] in the RAM 17 (Step S33), and the control returns to a main flow in FIG. 4.

Figure 4:
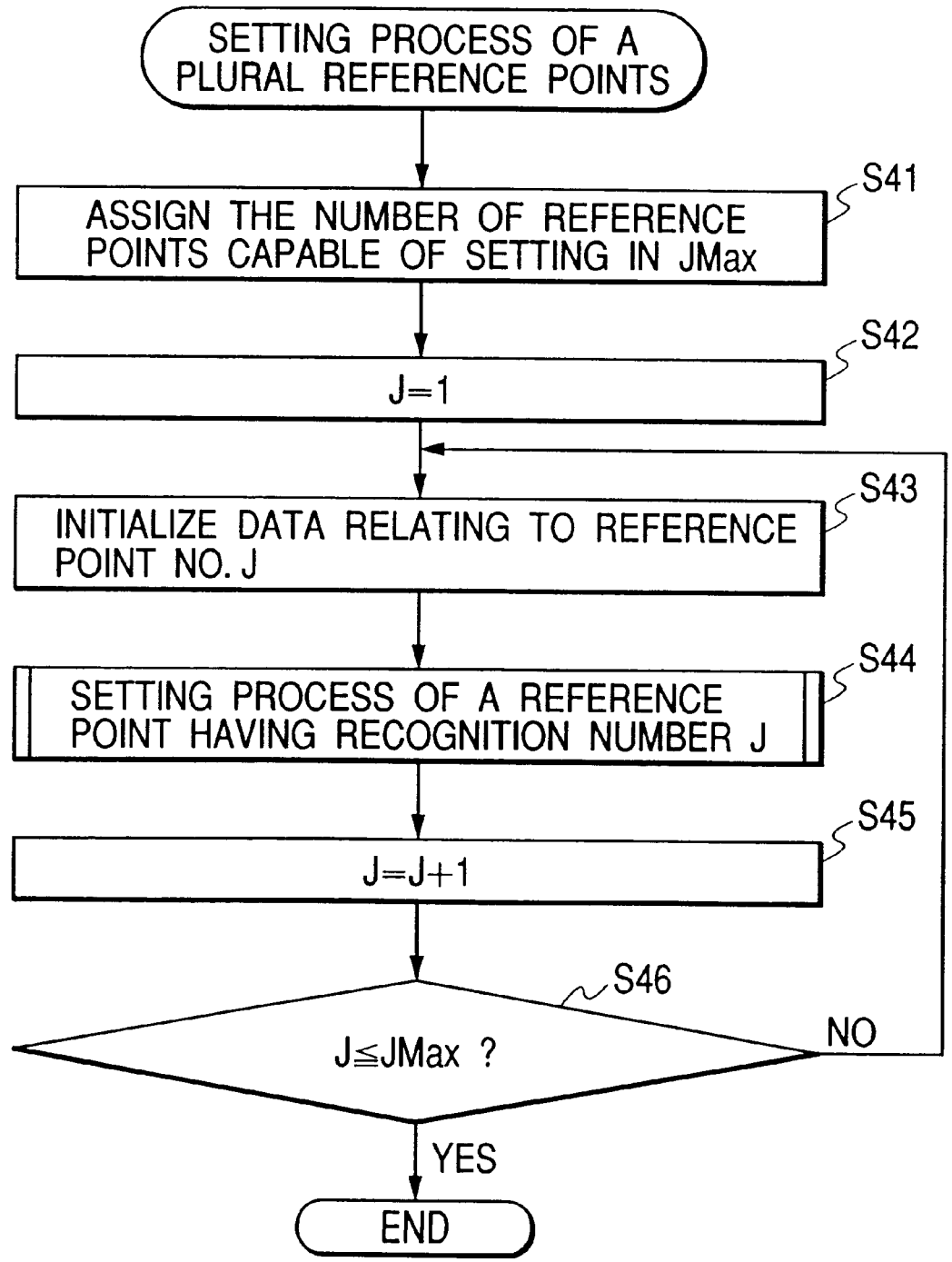
FIG. 4 is a flowchart of a setting process (main routine) of all reference points.

Referring to FIG. 4, there is shown a flowchart of a setting process (main routine) of a plurality of reference points.

The reference point setting part 12 sets the total number of reference points which can be set at a variable JMax in the RAM 17 (Step S41). Then, a counter J is initialized to 1 (Step S42). Next, an initialization is made for various data related to the reference point of the number J corresponding to the count value in the counter J (Step S43). This initialization includes an initialization of a pointer pattern used for generating a pointer mark with the reference point of the number J and an initialization of coordinate data of the reference point set as the reference point of the current number J.

Subsequently, a setting process is performed for the coordinate data of the reference point of the recognition number J described in FIG. 3 (Step S44). Next, the counter J is incremented by 1 (Step S45). Then, the count value in the counter J is compared with a numeric value of the variable JMax (Step S46). As a result, if the count value in the counter J is equal to or smaller than the numeric value of the variable JMax, it means that the setting process of the coordinate data has not been completed yet for all the reference points which can be set, and therefore the control returns to the step S43 to continue the above processing. If the count value in the counter J is greater than the numeric value of the variable JMax, it means that the setting process of the coordinate data has been completed for all the reference points which can be set, and therefore this process is ended.

Figure 5:
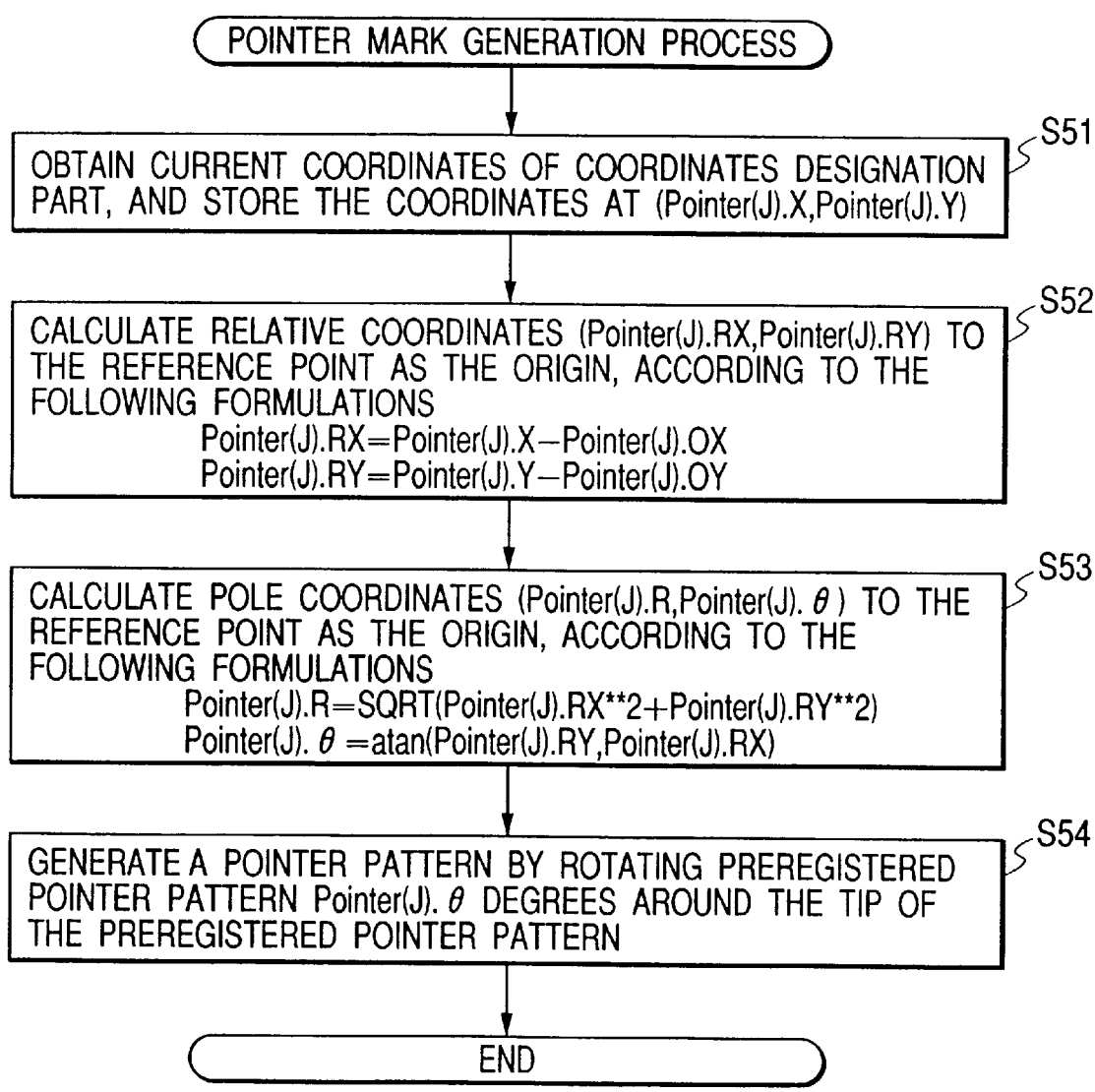
FIG. 5 is a flowchart of a pointer mark generation process.

Referring to FIG. 5, there is shown a flowchart of a pointer mark generation process performed by the pointer generation part 14. This pointer mark generation process is executed on reference points optionally selected by a user out of a plurality of preset reference points, and the flowchart in FIG. 5 is described in the case that the reference points of the recognition number J were selected.

First, the pointer generation part 14 obtains coordinate data currently pointed by the coordinates pointing means 11 from the above work [Pointer(J).OX, Pointer(J).OY] and sets it at [Pointer(J).X, Pointer(J).Y] (Step S51). Next, the following formulas are used to calculate relative coordinates [Pointer(J).RX, Pointer(J).RY] between the reference point and the pointing point with the reference point of the recognition number J as an origin (Step S52). In other words, the following is calculated:

$$Pointer(J).RX = Pointer(J).X - Pointer(J).OX \quad (1)$$

$$Pointer(J).RY = Pointer(J).Y - Pointer(J).OY \quad (2)$$

where Pointer(J).OX, Pointer(J).OY are coordinates of the reference point as described above.

Next, on the basis of the relative coordinates calculated in the Step S52, the following formula is used for a calculation in order to represent the coordinates currently pointed by the coordinates pointing means 11 by means of polar coordinates [Pointer(J).R, Pointer(J).θ] with the reference point related to the selection as an origin (Step S53). In other words, the following is calculated:

$$Pointer(J).R = SQRT[Pointer(J).RX^{}2 + Pointer(J).RY^{}2] \quad (3)$$

$$Pointer(J).\theta = a\tan[Pointer(j).RY, Pointer(J).RX] \quad (4)$$

where SQRT is a square root, ** is a power, and atan is inverse tangent.

Finally, a pointer pattern 61 (See FIGS. 6A and 6B) preregistered in the pointer generation part 14 is rotated by Pointer(J).θ degrees around the tip of the pointer pattern 61 to generate a pointer mark 22 (Step S54).

Figure 6A:
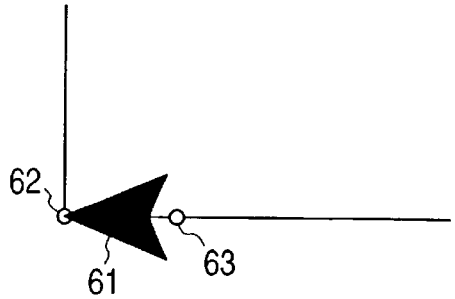
FIGS. 6A and 6B are diagrams for explaining a sample processing for processing a pre-registered pointer pattern in a pointer generation part.
Figure 6B:
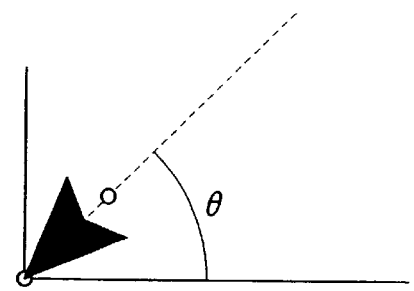

FIGS. 6A and 6B show an example generated on the basis of the pointer pattern 61 preregistered relative to the recognition number J. In FIGS. 6A and 6B, reference numeral 61 is a preregistered pointer pattern, numeral 62 is a tip of the pointer pattern, and numeral 63 is an end of the pointer pattern. When rotating the pointer pattern 61, it should be rotated around the tip 62 of the pointer pattern 61; for example, as shown in FIG. 6B, the pointer pattern 61 is rotated counterclockwise by θ degrees around the tip 62.

The above step S54 also includes a process of adding a linear component to the rotated pointer pattern 61 so that the pointer mark 22 has a total length calculated in the formula (3).

As a result of this processing, as shown in FIG. 2, the generated pointer mark 22 has a direction from the reference point 23 to the pointing point 24 and the tip of the pointer mark 22 (the tip of the arrow) is located in the pointing point 24. Accordingly, the direction of the pointer mark 22 displayed on the display screen 21 on which data or the like is displayed almost corresponds to a direction from an actual position of the explainer 25 toward the pointing point (designated position) 24 on data pointed at by the explainer 25, and therefore the explainer 25 is connected to the pointing point 24 in a natural form for the attendance of a lecture class or other meeting, so that the attendance do not have any sense of incongruity.

As can be supposed from the above description, in this embodiment, different pointer patterns are registered for respective reference points which have been set. For example, a pointer pattern such as "→" is registered for one reference point, while a pointer pattern such as "←" is registered for another reference point.

In the above embodiment, as the pointer mark 22, image data such as, for example, bit map data has been assumed. A rotation of bit map data, however, requires a relatively long processing time period, and therefore it may be inappropriate for some systems. In these systems, the pointer mark 22 is more efficiently described with vector data. In addition, while the pointer mark 22 is not blinked in the above embodiment, naturally the pointer mark 22 can be blinked.

Furthermore, it is also possible to display a straight line simply connecting the reference point 23 to the pointing point 24 as the pointer mark 22 without preregistering the pointer pattern. The pointer mark 22 can be shorter than a distance between the reference point 23 and the pointing point 24 only if it has a direction corresponding to a segment between the reference point 23 and the pointing point 24. In addition, if the pointer mark 22 is displayed with a dot image, it can also be lit on from the reference point 23 toward the pointing point 24 in units of a dot or of several dots sequentially.

As set forth hereinabove, according to this embodiment, it becomes possible to display a pointer mark preferable for an application to a presentation system for transferring an image displayed on a display screen to a projector or other apparatus to project it on a large-sized screen, by which there can be provided a presentation system which is easy to use for the explainer and helpful for the attendance to understand the explanation.

In this embodiment, the reference point is preset on the display screen, and when an arbitrary point on the display screen is designated, a pointer mark is generated and displayed on the display screen so as to have a direction from the preset reference point to the pointing point related to this designation and an image (including the pointer mark) displayed on this display screen is transferred to the projector so as to be projected on the large-sized screen. Therefore, the displayed pointer mark has a form which seems to connect the explainer to the pointing point (watch point) in a natural form, by which the mark is preferable for an application to a presentation system or the like.

[Another Embodiment]

Figure 7:
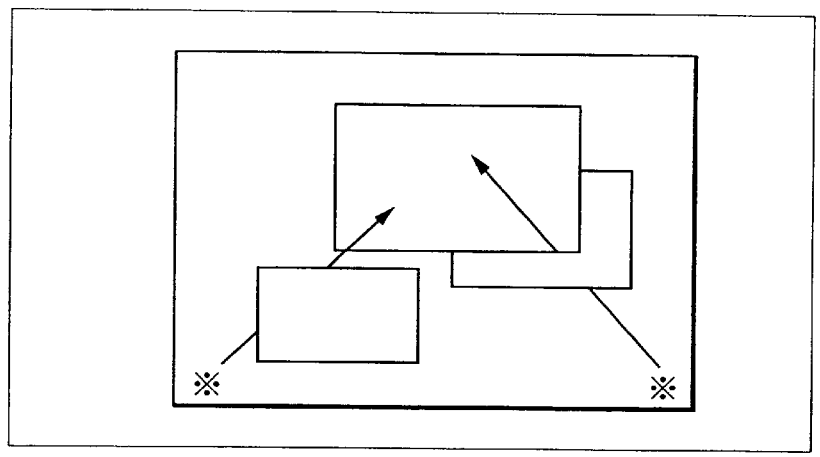
FIG. 7 is a diagram illustrating pointer marks displayed by a control of a pointer display control part 13 in another embodiment.

Referring to FIG. 7, there is shown a diagram illustrating pointer marks displayed under the control of a pointer display control part 13 in another embodiment.

Figure 8:
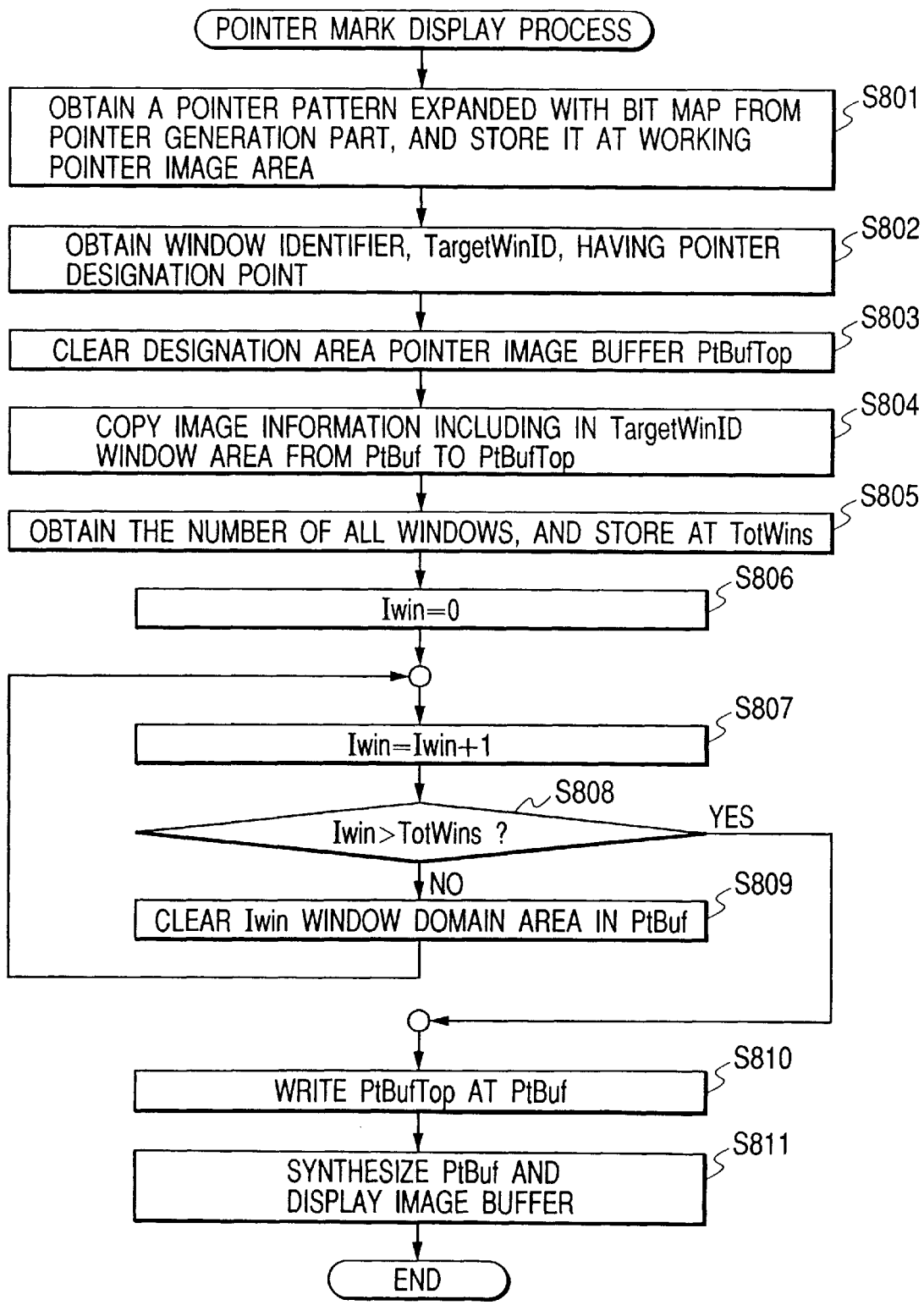
FIG. 8 is a flowchart of a pointer mark generation process in another embodiment.

The display in FIG. 7 is characterized by a display control of the pointer marks so that the pointer marks are displayed only in a window having pointing points and in a background area. The above processing is described below by using FIG. 8.

In Step S801, after obtaining a pointer pattern expanded with a bit map from a pointer generation part, the pointer pattern is stored in working pointer image area PtBuf. Next in Step S802, a window identifier TargetWin is obtained for the window having the pointing point of the pointer. Then, in Step S803, the content of a designation area pointer image buffer PtBufTop is initialized. Further in Step S804, an image information of the pointer in a part within the above TargetWin window is copied from the above pointer image area PtBuf to PtBufTop. Subsequently in Step S805, the total number of the displayed windows is obtained and stored in TotWins. Then, in Step S806, a window working counter Iwin is set to 0. In Step S807, a window working counter Iwin value is incremented by one. In Step S808, if Iwin is greater than TotWins, the control jumps to Step S810; otherwise, the control progresses to Step S809. In Step S809, is cleared an area of the pointer image area PtBuf overlapping the window domain area designated by the window working counter Iwin, and then the control returns to Step S807. In Step S810, the pointer mark image PtBufTop in the window having the pointing point stored in the Step S804 is written into the pointer image area PtBuf processed in the Steps S807 to S809. In Step S811, the processed pointer image information PtBuf is synthesized into the display screen buffer displayed on the display to complete the display process of a pointer mark pattern.

As set forth hereinabove, according to this embodiment, the pointer mark is displayed only in the window having the pointing point and in the background area, by which the pointer mark is displayed without covering data displayed in other windows, and therefore there can be provided a presentation system more easy to understand the explanation for the attendance.

[Another Embodiment]

Figure 9:
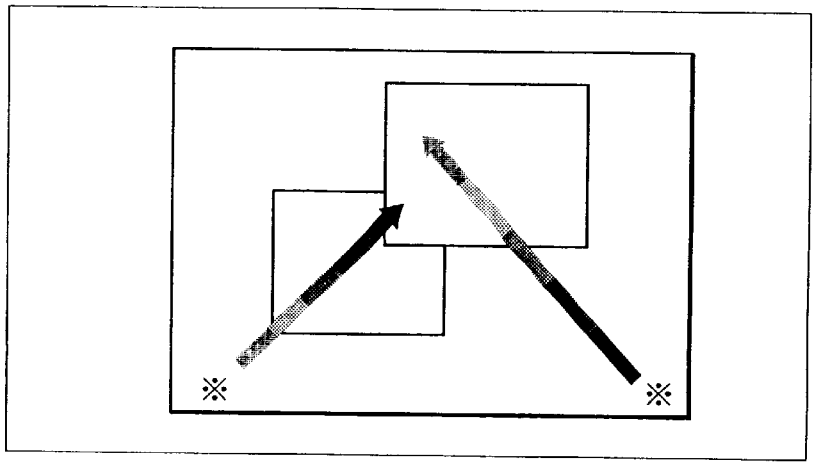
FIG. 9 is a diagram illustrating pointer marks displayed by a control of a pointer display control part 13 in still another embodiment.

This embodiment is characterized in that a pointer mark is made prominent so as to be focused on more intensively by displaying a pointer mark in gradation as shown in FIG. 9.

There are the following concrete methods of making the mark focused on more intensively:

(I) Generating a bit map image having monotonic brightness gradation between the reference point and the pointing point of the pointer image (II) Changing pixel values of the pointer mark by gradation by multiplying each value by a monotonic brightness gradation coefficient in a direction from the reference point to the pointing point of the pointer image (III) Generating a bit map image with deforming a model in a vector data format on the basis of the reference point coordinates and the pointing point coordinates and further varying pixel values of respective pixels so as to have monotonic brightness gradation in a direction from the reference point to the pointing point The above (II) method will be described below by using FIG. 10.

Referring to FIG. 10, there is shown a flowchart of operations of an apparatus characterized in that pixel values of a pointer mark are changed by gradation by multiplying each value by a monotonic brightness gradation coefficient in a direction from the reference point to the pointing point.

In FIG. 10, first a size of pointer pattern of a bit map image is changed or the pattern is rotated in order that the tip of the pattern corresponds to a pointing point and the end of the pattern corresponds to a reference point in Step S101. Next in Step S102, a brightness of a preset reference point is obtained and stored at variable VO. In the same manner, a brightness of a preset pointing point is obtained and stored at variable VR in Step S103. Then, in Step S104, a distance between the reference point and the pointing point is calculated and stored at Dmax. In Step S105, the processing is repeated for all the pixels in the pointer pattern. If the processing of all the pixels is completed, the control progresses to Step S109 to end the process. Otherwise, the control progresses to Step S106, first. In the Step S106, a pixel value V of the pointer pattern is checked. If it is 0, the control progresses to the Step S105 without any processing. Otherwise, the control progresses to Step S107. In the Step S107, a distance is obtained between the currently designated pixel position and the reference point and is stored at variable D. In Step S108, a pixel value of the designated pixel is replaced by a new pixel value according to the formula V=VO+D*(VR−VO)/Dmax, and then the control progresses to Step S105.

According to the above process, brightness gradation is given to the bit map pointer mark, by which an attention of the attendance can be focused on the mark more intensively.

[Another Embodiment]

This embodiment is characterized in that a pointer mark is focused on more intensively by using a blend. Particularly, it is characterized by synthesizing a pixel value of a pointer mark and a pixel value of an overlapping image according to a ratio, with the ratio changing monotonically by gradation between a reference point and a pointing point.

This embodiment will be described below by using FIG. 11.

In FIG. 11, first in Step S111, a size of a pointer pattern of a bit map image is changed or the pattern is rotated in order that the tip of the pattern corresponds to a pointing point and the end of the pattern corresponds to a reference point. Next, in Step S112, a distance is calculated between the reference point and the pointing point and is stored at Dmax. In Step S113, the process is repeated for all the pixels within the pointer pattern. If the process of all the pixels is completed, the control progresses to Step S119 to end the process. Otherwise, the control progresses to Step S114 first. In the Step S114, a pointer pattern pixel value V is checked. If it is 0, the control progresses to the Step S113 without any processing. Otherwise, the control progresses to Step S115. In the Step S115, a distance is calculated between the currently pointed pixel position and the reference point and is stored at variable D. In Step S116, a blend ratio a of the display image and the pointer pattern is calculated according to a formula α=D/Dmax. In Step S117, is obtained a pixel value of the display image which the pointed pixels of the pointer pattern are overlapping and is stored at variable U. In Step S118, a new pixel value of the pointer pattern is calculated according to a formula V=α*V+(1−α)*U and stored at V, and then the control progresses to the Step 113.

According to the above process, the cursor pointer can be focused on more intensively.

[Another Embodiment]

Figure 12:
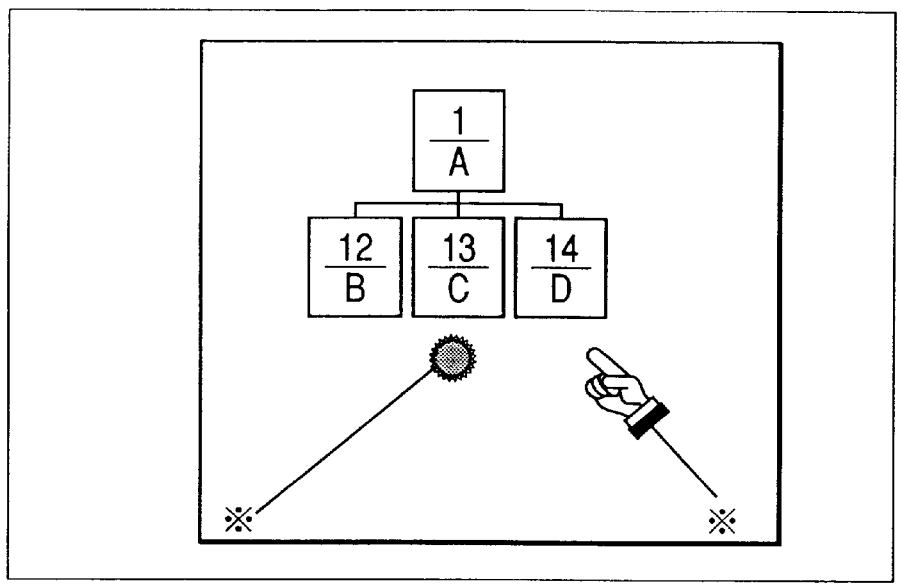
FIG. 12 is a diagram illustrating pointer marks displayed by a control of a pointer display control part 13 in further still another embodiment.

While the entire display of the cursor pointer has been arranged so that the pointer is focused on more intensively in the above embodiments, as shown in FIG. 12, a specific pattern or image can be displayed at a tip of a pointer mark so that the icon is focused on more intensively.

Figure 13:
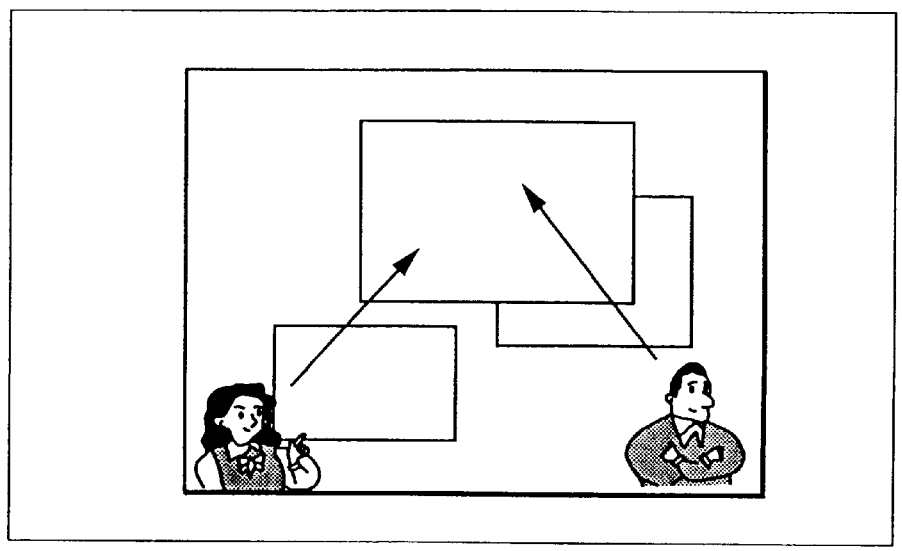
FIG. 13 is a diagram illustrating pointer marks displayed by a control of a pointer display control part 13 in further still another embodiment.

In addition, as shown in FIG. 13, an image of an explainer can be displayed at an end of a cursor pointer so that the attendance readily understand who is the explainer.

What is claimed is:

1. A pointer mark display controller, comprising:
   a pointing means for pointing an arbitrary point on a display screen;
   a setting means for presetting a reference point on the display screen;
   a generation means for generating a pointer mark when an arbitrary point on the display screen is designated by said pointing means, wherein the pointer mark has a direction from a reference point set by said setting means to a pointing point related to the designation; and
   a display control means for displaying the pointer mark generated by said generation means on the display screen.

2. A pointer mark display controller according to claim 1, wherein said generation means generates a pointer mark having a direction from the pointing point to the reference point by processing a pointer mark preregistered as a model.

3. A pointer mark display controller according to claim 1, wherein the pointer mark registered as the model is composed of a bit map data format.

4. A pointer mark display controller according to claim 1, wherein the pointer mark registered as the model is composed of a vector data format.

5. A pointer mark display controller according to claim 1, wherein said generation means generates an arrow-shaped pointer mark having a direction from the reference point to the pointing point.

6. A pointer mark display controller according to claim 1, wherein said setting means presets a plurality of reference points and said generation means generates a pointer mark by using reference points optionally selected out of the set plurality of reference points.

7. A pointer mark display controller according to claim 1, wherein said display control means displays the pointer mark generated by said generation means on the display screen with the pointer mark blinking.

8. A pointer mark display controller according to claim 1, wherein said display control means displays the pointer mark generated by said generation means in a dot image with sequentially lighting the image every unit of a dot or of several dots from the reference point to the pointing point.

9. A pointer mark display controller according to claim 1, further comprising a transfer control means for transferring the image displayed on the display screen to a projector to project it on a screen.

10. A pointer mark display controller according to claim 1, wherein the display control means controls the image so as to be displayed in a window having the pointing point and in a background area.

11. A pointer mark display controller according to claim 3, wherein the pointer mark registered as the model is a bit map image having brightness gradation between the reference point and the pointing point.

12. A pointer mark display controller according to claim 1, wherein said generation means changes a pixel value of the pointer mark by multiplying each value by a brightness gradation coefficient from the reference point to the pointing point.

13. A pointer mark display controller according to claim 1, wherein said generation means deforms the model in the vector data format on the basis of information of the reference point coordinates and the pointing point coordinates to generate a bit map image and then varies pixel values of respective pixels so as to have brightness gradation in a direction from the reference point to the pointing point.

14. A pointer mark display controller according to claim 1, wherein said display control means synthesizes a pixel value of the pointer mark and a pixel value of the overlapping image according to a ratio varying between the reference point and the pointing point.

15. A pointer mark display controller according to claim 1, wherein said display control means displays a specific pattern or image at the pointing point.

16. A pointer mark display controller according to claim 1, wherein said display control means displays a specific pattern or image at the reference point.

17. A pointer mark display control method, comprising the steps of:
   pointing an arbitrary point on a display screen;
   presetting a reference point on the display screen;
   generating a pointer mark when an arbitrary point on the display screen is designated in said pointing step, wherein the pointer mark has a direction from a reference point set in said presetting step to a pointing point related to the designation; and
   controlling a display by displaying the pointer mark generated in said generation step on the display screen.

18. A pointer mark display control method according to claim 17, wherein said generation step includes generating a pointer mark having a direction from the reference point to the pointing point by processing a pointer mark preregistered as a model.

19. A pointer mark display control method according to claim 17, wherein the pointer mark registered as the model is composed of a bit map data format.

20. A pointer mark display control method according to claim 17, wherein the pointer mark registered as the model is composed of a vector data format.

21. A pointer mark display control method according to claim 17, wherein the generation step includes generating an arrow-shaped pointer mark having a direction from the reference point to the pointing point.

22. A pointer mark display control method according to claim 17, wherein said presetting step includes presetting a plurality of reference points and said generation step includes generating a pointer mark by using reference points optionally selected out of the set plurality of reference points.

23. A pointer mark display control method according to claim 17, wherein said display control step includes displaying the pointing mark generated in said generation step on the display screen with the pointer mark blinking.

24. A pointer mark display control method according to claim 17, wherein said display control step includes displaying the pointer mark generated in said generation step in a dot image with sequentially lighting the image every unit of a dot or of several dots in a direction from the reference point to the pointing point.

25. A pointer mark display control method according to claim 17, further comprising a transfer control step for transferring the image displayed on the display screen to a projector to project it on a screen.

26. A pointer mark display control method according to claim 17, wherein said display control step includes controlling the image so as to be displayed in a window having the pointing point and in a background area.

27. A pointer mark display control method according to claim 19, wherein the pointer mark registered as the model is a bit map image having brightness gradation between the reference point and the pointing point.

28. A pointer mark display control method according to claim 17, wherein said generation step includes varying pixel values of the pointer mark by multiplying each value by a brightness gradation coefficient in a direction from the reference point to the pointing point.

29. A pointer mark display control method according to claim 17, wherein said generation step includes deforming the model in the vector data format on the basis of information of the reference point coordinates and the pointing point coordinates to generate a bit map image and then varying pixel values of respective pixels so as to have brightness gradation in a direction from the reference point to the pointing point.

30. A pointer mark display control method according to claim 17, wherein said display control step includes synthesizing a pixel value of the pointer mark and a pixel value of the overlapping image according to a ratio varying between the reference point and the pointing point.

31. A pointer mark display control method according to claim 17, wherein said display control step includes displaying a specific pattern or image at the pointing point.

32. A pointer mark display control method according to claim 17, wherein said display control step includes displaying a specific pattern or image at the reference point.

33. A display control system for transferring an image displayed on a display screen of an information processing unit to a projector to project it on a screen, said information processing unit comprising:
   a pointing means for pointing an arbitrary point on a display screen;
   a setting means for presetting a reference point on the display screen;
   a generation means for generating a pointer mark when an arbitrary point on the display screen is designated by said pointing means, wherein the pointer mark has a direction from a reference point set by said setting means to a pointing point related to the designation; and
   a display control means for displaying the pointer mark generated by said generation means on the display screen.

34. A display control system according to claim 33, wherein said generation means generates a pointer mark having a direction from the pointing point to the reference point by processing a pointer mark preregistered as a model.

35. A display control system according to claim 33, wherein the pointer mark registered as the model is composed of a bit map data format.

36. A display control system according to claim 35, wherein the pointer mark registered as the model is composed of a vector data format.

37. A display control system according to claim 33, wherein said generation means generates an arrow-shape pointer mark having a direction from the reference point to the pointing point.

38. A display control system according to claim 33, wherein said setting means presets a plurality of reference points and said generation means generates a pointer mark by using reference points optionally selected out of the set plurality of reference points.

39. A display control system according to claim 33, wherein said display control means displays the pointer mark generated by said generation means on the display screen with the pointer mark blinking.

40. A display control system according to claim 33, wherein said display control means displays the pointer mark generated by said generation means in a dot image with sequentially lighting the image every unit of a dot or of several dots in a direction form the reference point to the pointing point.

41. A storage medium for storing a control program for transferring an image displayed on a display screen of an information processing unit to a projector to project it on a screen, said control program comprising:

a pointing routine for pointing an arbitrary point on a display screen;

a setting routine for presetting a reference point on the display screen;

a generation routine for generating a pointer mark when an arbitrary point on the display screen is designated by said pointing routine, wherein the pointer mark has a direction from a reference point set by said setting routine to a pointing point related to the designation; and a display control routine for displaying the pointer mark generated by said generation routine on the display screen.

42. A storage medium according to claim 41, wherein said generation routine is used to generate a pointer mark having a direction from the reference point to the pointing point by processing a pointer mark preregistered as a model.

43. A storage medium according to claim 41, wherein the pointer mark registered as the model is composed of a bit map data format.

44. A storage medium according to claim 41, wherein the pointer mark registered as the model is composed of a vector data format.

45. A storage medium according to claim 41, wherein said generation routine is used to generate an arrow-shaped pointer mark having a direction from the reference point to the pointing point.

46. A storage medium according to claim 41, wherein said setting routine is used to preset a plurality of reference points and said generation routine generates a pointer mark by using reference points optionally selected out of the set plurality of reference points.

47. A storage medium according to claim 41, wherein said display control routine is used to display the pointer mark generated by said generation routine on the display screen with the pointer mark blinking.

48. A storage medium according to claim 41, wherein said display control routine is used to display the pointer mark generated by said generation routine in a dot image with sequentially lighting the image every unit of a dot or of several dots in a direction from the reference point to the pointing point.

49. A storage medium according to claim 41, further comprising a transfer control routine for transferring the image displayed on the display screen to a projector to project it on a screen.

50. A storage medium according to claim 41, wherein said display control routine is used to control the image so as to be displayed in a window having the pointing point and in a background area.

51. A storage medium according to claim 43, wherein the pointer mark registered as the model is a bit map image having brightness gradation between the reference point and the pointing point.

52. A storage medium according to claim 41, wherein said generation routine is used to change pixel values of the pointer mark by multiplying each value by a brightness gradation coefficient in a direction from the reference point to the pointing point.

53. A storage medium according to claim 41, wherein said generation routine is used to deform the model in the vector data format on the basis of information of the reference point coordinates and the pointing point coordinates to generate a bit map image and then to vary pixel values of respective pixels so as to have brightness gradation in a direction from the reference point to the pointing point.

54. A storage medium according to claim 41, wherein said display control routine is used to synthesize a pixel value of the pointer mark and a pixel value of the overlapping image according to a ratio varying between the reference point and the pointing point.

55. A storage medium according to claim 41, wherein said display control routine is used to display a specific pattern or image at the pointing point.

56. A storage medium according to claim 41, wherein said display control routine is used to display a specific pattern or image at the reference point.

* * * * *

UNITED STATES PATENT AND TRADEMARK OFFICE
CERTIFICATE OF CORRECTION

PATENT NO.    : 6,392,674 B1                                          Page 1 of 1
DATED         : May 21, 2002
INVENTOR(S)   : Yukio Hiraki et al.

It is certified that error appears in the above-identified patent and that said Letters Patent is hereby corrected as shown below:

Column 3,
Line 64, "awaiting" should read -- waiting --.

Column 4,
Line 64, "a tan" should read -- atan --.

Column 5,
Line 28, "attendance" should read -- attendants --.
Line 29, "attendance" should read -- attendants --.
Line 63, "attendance" should read -- attendants --.

Column 6,
Line 51, "attendance." should read -- attendants. --.

Column 8,
Line 12, "attendance" should read -- attendants --.
Line 22, "set by said setting" should be deleted.
Line 23, "means to a melting point" should be deleted.

Column 10,
Line 63, "arrow-shape" should read -- arrow-shaped --.

Column 11,
Line 12, "form" should read -- from --.

Signed and Sealed this

Twenty-sixth Day of November, 2002

*Attest:*

*Attesting Officer*

JAMES E. ROGAN
*Director of the United States Patent and Trademark Office*